(12) United States Patent
Baykut et al.

(10) Patent No.: US 7,615,743 B2
(45) Date of Patent: Nov. 10, 2009

(54) OVERCOMING SPACE CHARGE EFFECTS IN ION CYCLOTRON RESONANCE MASS SPECTROMETERS

(75) Inventors: Gökhan Baykut, Bremen (DE); Roland Jert, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 127 days.

(21) Appl. No.: 11/957,613

(22) Filed: Dec. 17, 2007

(65) Prior Publication Data

US 2009/0084948 A1  Apr. 2, 2009

(51) Int. Cl.
*H01J 49/26* (2006.01)
*B01D 59/44* (2006.01)

(52) U.S. Cl. .................. 250/282; 250/281; 250/283; 250/291; 250/292; 250/293; 250/307

(58) Field of Classification Search ................. 250/282, 250/281, 291, 292, 293, 283, 307
See application file for complete search history.

(56) References Cited

U.S. PATENT DOCUMENTS

| 5,019,706 | A | 5/1991 | Allemann et al. |
| 7,038,200 | B2 | 5/2006 | Nikolaev |
| 7,368,711 | B2 * | 5/2008 | Franzen et al. ............... 250/291 |
| 7,495,211 | B2 * | 2/2009 | Franzen et al. ............... 250/291 |
| 2006/0027743 | A1 | 2/2006 | Franzen et al. |
| 2006/0226357 | A1 | 10/2006 | Franzen et al. |

* cited by examiner

*Primary Examiner*—Nikita Wells
(74) *Attorney, Agent, or Firm*—Law Offices of Paul E. Kudirka

(57) ABSTRACT

In an ion cyclotron resonance mass spectrometer in which ions are trapped axially by applying electrical potentials to a pattern of electrode elements to produce an inhomogeneous alternating radio-frequency electric field with a repulsive effect, an additional electrostatic ion-attracting field is superimposed on the repulsive electric field. The voltage of the ion-attracting field is adjusted to compensate for a cyclotron frequency shift of the ions caused by the ion space charge. The voltage of the ion-attracting field can be adjusted so that the ion cyclotron frequency of all ions becomes independent of the number of ions inside the spectrometer.

18 Claims, 6 Drawing Sheets

FIG. 5a *(Prior Art)*

OVERCOMING SPACE CHARGE EFFECTS IN ION CYCLOTRON RESONANCE MASS SPECTROMETERS

BACKGROUND

The invention relates to a method to deal with space charge effects in ion cyclotron resonance mass spectrometers and to devices for applying this method.

Fourier transform ion cyclotron resonance mass spectrometry (FT-ICR MS), where the ions are trapped by a magnetic field and an electrostatic field in the ICR trap, delivers the highest mass precision and the highest mass resolution among all mass spectrometric methods. The mass precision, however, is strongly influenced by the space charge inside the ICR trap, and trials to control the space charge are of moderate success only.

The operation and function of a conventional ion cyclotron resonance mass spectrometer can be described by using FIG. 1. Ions are produced, for example, by electrospray in a vacuum-external ion source (1). They are introduced, together with ambient gas, through a capillary (2) into the first stage (3) of a differential pumping system, which consists of a series of chambers (3), (5), (7), (9), (11) and (13) and is pumped by the pumps (4), (6), (8), (10), (12) and (14). Ions in the chambers (3) and (5) are drawn in by the ion funnels (14) and (15) and transferred into the multipole ion guiding system (16), in which ions can be either guided through or also be stored. The ions are subsequently transferred through a quadrupole mass filter (17) and through another multipole ion guide (18) that also allows ion storage, and finally via the main ion transfer system (19) into the ICR trap (20), where they are captured and trapped.

The ICR trap (20) usually consists of four mantle-shaped enclosing longitudinal electrodes (21) and of two trapping electrodes (22) with a central hole in each of them. The vacuum system has a laser window (23) in order to allow photo-dissociation experiments in the ICR trap. The ICR trap is located in the homogeneous zone of a strong magnetic field that is generated by superconducting coils in a helium cryostat (24), and has a high constancy in time, as well as a high homogeneity. The magnetic field is aligned parallel to the longitudinal electrodes (21) of the ICR trap. In the ion transfer system the ions can be deflected or diverted to a detector for an external determination of the total ion current. In FIG. 1 such a detector (25) is depicted as an example. Ions can be deflected into the direction of this detector whenever a total ion current measurement is desired.

In an ion cyclotron resonance mass spectrometer ions are radially trapped by the strong magnetic field and perform their cyclotron motions. In order to trap the ions along the magnetic field lines in axial direction, repulsive electric fields are used. They are generated by a DC-voltage (trapping voltage) that is connected to trapping electrodes (usually planar plates), which cover the front end and the back end of the ICR trap. This voltage generates a repulsive potential for ions. The excitation and detection electrodes of the ICR trap are on ground potential in terms of the DC-voltage. Consequently, the ions perform an additional motion in the trap, which is independent of the cyclotron motion, the so-called "trapping oscillation". For the determination of masses with the FT-ICR mass spectrometer ions are excited to cyclotron orbits using a dipolar frequency-scanned radiofrequency field. During the excitation, all ions with the same mass-to-charge ratio form coherent ion clouds, which induce image currents when they fly near the detection electrodes. These image currents are amplified, digitized and Fourier transformed into a frequency spectrum. From this frequency spectrum, mass values can be determined with a high precision. A mass calibration leads to accurate mass values.

The application of the trapping voltage destroys the ideal conditions for a pure cyclotron motion, which is actually defined in an electrically field-free environment in a homogeneous magnetic field. However, since the trapping field is necessary for the operation of a conventional state of the art ICR trap, the electrostatic field thus created in the ICR trap is tolerated. The axial and radial components of this electrostatic field are dependent on the position inside the ICR cell. As the ions move due to their trapping oscillation and their cyclotron motion (in particular after the excitation by the RF field) in a relatively large volume in the trap, they experience different forces caused by position-dependent electric field vectors.

A common problem of all ion traps is the space charge due to the large number of ions stored in the trap at the same time. The space charge creates an extra electric field in the ion trap additional to the electrostatic trapping field. The electric field of the space charge in the ICR trap interacts with the cyclotron motion of the ions, as well as with the electrostatic field of the trapping electrodes.

In theory, the revolving frequency $\omega_c = 2\pi \nu_c$ of the cyclotron motion of ions with mass m and charge q in a magnetic field of flux density B is given as the so-called cyclotron frequency $\omega_c = qB/m$. The frequency of the trapping oscillation of ions in the direction of the magnetic field axis is given as $\omega_T = \sqrt{\{2q\alpha V_T/(ma^2)\}}$, where $V_T$ is the applied trapping voltage, a the distance between the trapping electrodes and $\alpha$ a geometry constant. The trapping potential also affects the cyclotron motion and changes the cyclotron frequency. The reduced cyclotron frequency $\omega+$ due to the trapping potential is given by the following well known equation [1]:

$$\omega_+ = \frac{\omega_c}{2} + \sqrt{\frac{\omega_c^2}{4} - \frac{q\alpha V_T}{ma^2}}. \quad [1]$$

The space charge causes a further reduction of the cyclotron frequency to a value of $\omega_{R,+}$ which is expressed by an additional negative term in the square root of the equation [1] above:

$$\omega_{R,+} = \frac{\omega_c}{2} + \sqrt{\frac{\omega_c^2}{4} - \left(\frac{2q\alpha V_T}{ma^2} + \frac{\rho q^2 G_i}{\varepsilon_0 m}\right)}. \quad [2]$$

Here, $\rho$ is the number density of the ions, $G_i$ is a geometry factor of the ion cloud, $\varepsilon_0$ the dielectric constant of vacuum. Expression (2) has to be considered as critical in practice because experiments indicate that not only the number of charges but also the distribution of the charges onto ions of different masses influence the measured ion cyclotron frequency.

A device to avoid the electrostatic trapping field in FT-ICR mass spectrometry is described in U.S. Pat. No. 7,038,200 B2 (E. N. Nikolaev), in which an ICR trap is introduced, that utilizes trapping electrodes with parallel wires (or a pattern of electrodes). In that invention, the trapping electrodes of the ICR trap are connected to an alternating radio frequency voltage in a way, so that the adjacent elements of the pattern (e.g. wires) have different phases. Thus, only ions in the direct vicinity of the trapping electrodes experience a repulsive force and return. The well known term "pseudopotential" provides a vivid description of this effect. In a first approximation, the pseudopotential is a function of the local electric field strength, of the mass and the charge of the ion, as well as the frequency of the alternating electric field. In the following, this pseudopotential will be called "alternating field-induced pseudopotential".

The utilization of an alternating radio frequency voltage for trapping ions in an ICR trap is however associated with problems, since the mass determination is performed here by measuring radio frequencies of the extremely tiny image currents. From the patent applications US 2006/0226357 A1, DE 10 2004 061821 A1 or GB 2 421 632 A (J. Franzen and E. N. Nikolaev) it is known that there is a further way of operating an ICR trap with a pattern of trapping electrodes, which no longer requires a radio frequency voltage. In this ICR trap the adjacent elements of the electrode pattern situated at both ends of the ICR trap generate electrostatic potentials with opposite polarities. If ions that revolve on their cyclotron orbits approach the trapping electrodes, they cross the inhomogeneous fields of the electrode elements of different polarities. Hence, they experience an inhomogeneous and alternating field due to their motion relative to these electrodes, at which they are reflected back into the ICR trap. In this case the ions experience a repulsive pseudopotential during their flight passing near the electrode elements as a result of their motion. A resting ion would not experience such a pseudopotential. In the following, this pseudopotential will be called "motion-induced pseudopotential".

Such an ICR ion trap is favorably operated with spoke-like elements of the trapping electrode pattern. The operation with DC voltages of alternating polarity has distinct advantages vs. operation with RF voltages: (1) In the case of DC voltages, there is no lower cut-off mass for the reflection of ions, as in the case of an RF operation. (2) The strength of the motion-induced pseudopotential is proportional to the mass m of the ions, whereas the strength of the alternating voltage-induced pseudopotential decreases with 1/m. Heavy ions are much better reflected by a spoke-like grid operated with DC voltages of alternating polarity.

Such an ICR trap provides in its internal volume an environment that is free of electrostatic fields. Under these conditions, an ion describes a cyclotron motion with an unperturbed cyclotron frequency $\omega_c$. However, if more ions are captured in the ICR trap, they cause an additional electrostatic field in the trap due to their own space charge, which again reduces the cyclotron frequency of individual ions. This effect is similar to the effect of the conventional electrostatic trapping field.

SUMMARY

The present invention is based on the known method and the known device for an ICR mass spectrometer, in which the ions are axially trapped by potentials applied to a pattern of electrodes. During their flight near this pattern of electrodes the ions experience an inhomogeneous alternating electric field with a repelling force. This repelling force can be generated preferably as a motion-induced pseudopotential or, less preferably, as an alternating field-induced pseudopotential. In the following, only the preferred case of the motion-induced pseudopotential will be described in detail; it should be kept in mind, however, that the alternating field-induced pseudopotential always may be regarded as an alternative. The case of motion-induced pseudopotentials is preferred because there is no lower cut-off mass for reflection, and the strength of the motion-induced pseudopotential increases with the mass of the ions.

The present invention consists in superimposing an additional electrostatic ion-attracting field in the ICR trap to this spatially alternating electric field which is experienced by the ions. The ion-attracting field, if applied symmetrically to both trapping electrode pattern, divides the wide-stretched orbiting ion clouds and forms two orbiting ion clouds nearer to the pattern of electrodes. The mass spectrometer must be equipped with a power supply that provides the voltage to generate the additional electrostatic field in the ICR trap. The electrostatic field causes a shift of the cyclotron frequency in a direction opposite to the shift direction caused by space charge. The shift of the cyclotron frequency increases with the strength of the additional electrostatic field. The invention can be used in two ways:

(1) The additional electrostatic compensation field can be used to compensate for the shift of the cyclotron frequencies caused by space charge. This type of operation requires either a measurement of the strength of the space charge, or requires a control of the filling process to achieve a load with a known number of ions inside the ICR trap.

(2) Surprisingly, the additional electrostatic compensation field can be adjusted in a way that the space charge-induced shift on the cyclotron frequency becomes independent of the space charge, i.e., at a specific strength of the additional electrostatic compensation field the measured cyclotron frequency of an ion is no longer dependent on the space charge. Furthermore, and quite unexpectedly, at this unique adjustment, the independence of the cyclotron frequency of the space charge is valid for all ions regardless of mass and intensity. A mass calibration with this unique adjustment remains valid regardless of the degree of filling of the ICR trap with ions, as long as the ICR trap is operated with this unique adjustment of the ion-attracting compensation potential.

In the following, the pattern of electrodes that keeps the ions in the ICR trap by repulsive forces will be called the "trapping electrode pattern". The potentials generated by the trapping electrode pattern will be called "electrode pattern potentials". The individual elements of the trapping electrode pattern will be called the "elements of the electrode pattern" or "electrode pattern elements". The additional electrostatic field that is applied for the reduction of the space charge-related cyclotron frequency shift will be called the "compensation field", and the corresponding potential will be called the "compensation potential". The effect of the compensation potential on the ions is not repulsive, but attractive. It does not trap the ions.

The compensation field can be generated by superposing a DC voltage on the spatially alternating voltages or by applying voltages to the trapping electrodes pattern in an unbalanced way, so that adjacent elements of the electrode pattern have opposite polarities but not exactly the same absolute value. The resulting field pattern will be asymmetric in the direct vicinity of the trapping electrodes, while in larger distances only a resulting attractive electrostatic field remains.

The compensation field in the ICR trap is turned on before the image current detection and preferably after the excitation of the cyclotron motion of the ions. But it might also be turned on before excitation. Hence, during the subsequent determination of the cyclotron frequency of the ions the correction of the space charge is already completed.

BRIEF DESCRIPTION OF THE DRAWINGS

FIG. 5a shows a classical infinity trapping electrode (state of the art) of an ICR trap.

DETAILED DESCRIPTION

While the invention has been shown and described with reference to a number of embodiments thereof, it will be recognized by those skilled in the art that various changes in form and detail may be made herein without departing from the spirit and scope of the invention as defined by the appended claims.

Figure 2:
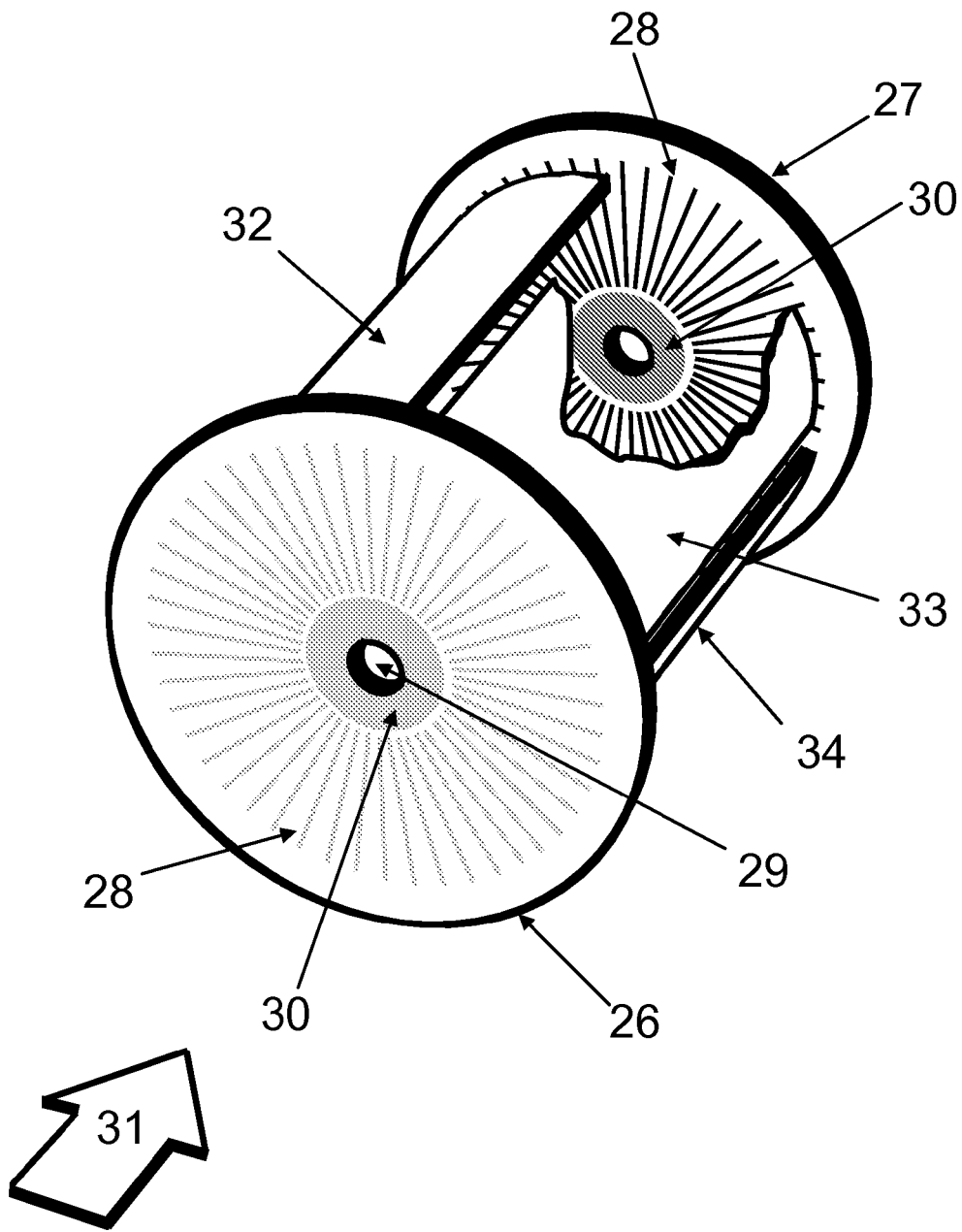
FIG. 2 shows an ICR trap constructed according to the most recent state of the art, onto which the present invention is applied.

FIG. 2 shows a cylindrical ICR trap with trapping plates equipped with an electrode pattern consisting of thin radial spokes. According to the state of the art, static voltages of the same absolute values but opposite polarities are applied to the adjacent spokes of this plate. At these trapping plates circulating ions are reflected due to the motion-induced pseudopotential. In FIG. 2, trapping plates (26) and (27) hold the spoke pattern (28). On the one side of the ICR trap, the hole (29) is used for the introduction of ions, on the other side of the trap, this hole is used for the introduction of electrons or photons for ion fragmentation. A central DC voltage electrode (30) is used for trapping thermal ions, whose cyclotron radii are so small before the excitation of the cyclotron motion, that they cannot experience the spoke pattern (28). The arrow (31) indicates the direction of the magnetic field during the operation of these ICR traps. In this figure, (32) and (34) are the detection electrodes, and (33) one of the two excitation electrodes. The second excitation electrode is located on the other side of the ICR trap and is not visible in this figure.

Figure 3:
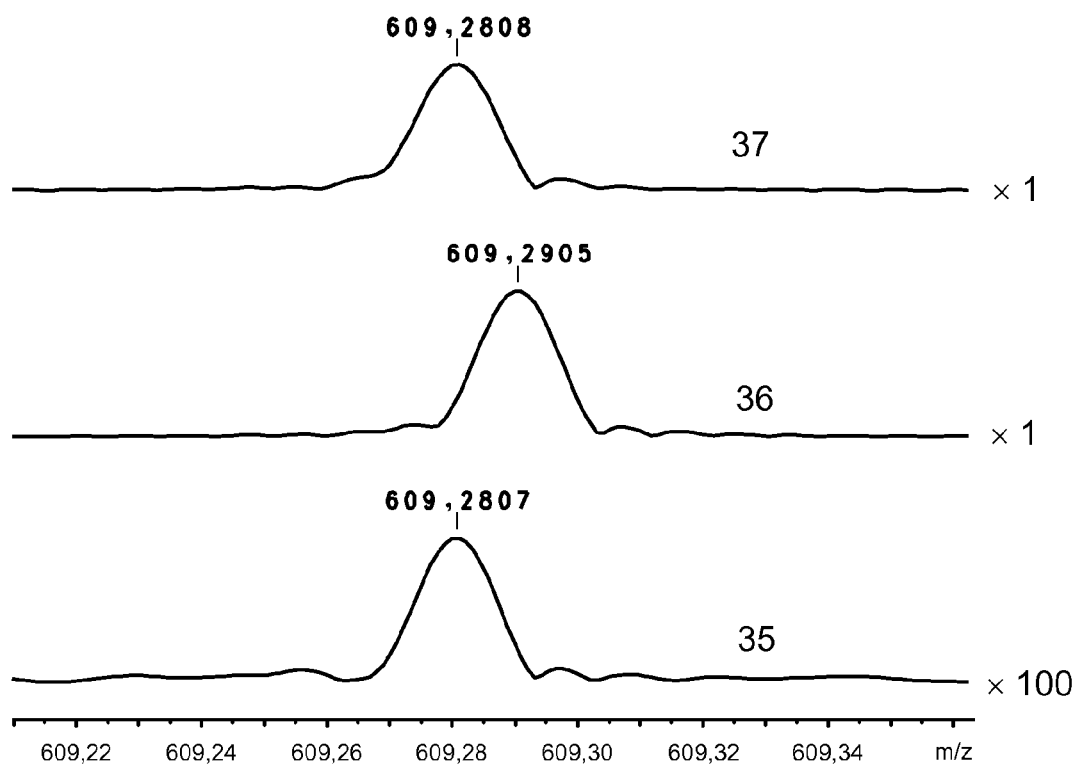
FIG. 3 shows an example for the correction of the ion mass signals by applying the attractive compensation potential.

FIG. 3 helps to visualize the compensation of the space charge-related mass shift by applying the additional electrostatic compensation field. It shows a part of the mass spectrum (35) with the monoisotopic peak of the protonated molecule of reserpine, acquired in the ICR trap having a trapping electrode pattern with radial spokes. In this experiment the voltages of +50V and −50V were applied to each adjacent pair of spokes, which must have opposite polarities. The ions were trapped in the ICR trap due to the repulsive effect of the alternating electric field, which they experience when flying near the spoke pattern near the trapping electrodes. This spectrum (35) was mass calibrated in the given space charge conditions. All further spectra were acquired using this mass calibration in order to be able to observe the relative mass shift of the ion signal at larger number of ions.

After the acquisition of the spectrum (35) the amount of reserpine introduced into the mass spectrometer was increased, so that approximately a hundredfold intensive signal of the protonated reserpine appeared (36). For the sake of clarity, the spectrum (35) is depicted with a magnification by a factor of hundred (indicated by the remark "×100" on the right side of the spectrum). Compared to (35) the ion signal in (36) is shifted towards higher mass values, since the existence of a larger space charge in the ICR trap correspondingly causes a larger reduction in the cyclotron frequency. The spectrum (37) shows that the cyclotron frequency shift can be practically compensated for by an additional electrostatic potential. During the acquisition of this spectrum voltages of +50V and −50, 45V are applied to the adjacent spokes. Potentials generated this way were therefore no longer symmetrical, which resulted in a compensation potential in the ICR trap of the net value of −0.225V (−0.45/2 Volt).

The additional electrostatic field needed for the reduction of the space charge-related shift of the cyclotron frequency can be generated by the same electrodes of the trapping electrode pattern, from which the ions experience the repulsive force of the motion-induced pseudopotential. The additional electrostatic field can also be generated by additional separated and insulated electrodes or pattern of electrodes. These can be placed e.g. between the electrodes of the trapping electrode pattern. In the following, if separated additional electrodes or pattern of electrodes are used for the generation of the additional electrostatic field, they will be called "compensation electrodes" or "compensation electrode pattern" respectively.

The additional electrostatic field is adjusted in a way, so that it compensates at least a part of the radial field of the space charge. The radial field generated by the ions or by the trapping potentials (in a conventional ICR trap) is the main source of the cyclotron frequency shifts, since in this case the Lorentz force not only has to compensate the centrifugal force but also the radial electric force $q\vec{E}_R$:

$$q\vec{v}_\perp \times \vec{B} = \frac{m\vec{v}_\perp^2}{\vec{r}_\perp^2}\vec{r}_\perp + q\vec{E}_R. \qquad [3]$$

Here m is the mass of the ion, q its electrical charge, $\vec{v}_\perp$ its velocity perpendicular to the magnetic field direction, $\vec{B}$ the magnetic flux density, $\vec{r}_\perp$ the cyclotron radius and $\vec{E}_R$ the radial component (the component perpendicular to the magnetic field) of the electric field at the position of the acting force.

An important detail for the operation of an ICR mass spectrometer is that ions which arrive at the ICR trap with thermal velocities move on very small cyclotron orbits when they are captured in the trap. A singly charged thermal ion of a 1000 Da molecule in a magnetic field of 7 Tesla revolves on a cyclotron orbit with approximately a tenth of a millimeter radius. Since normally the trap electrode patterns are "coarser grained" the ions with extremely small orbit radii would not be able to experience the repulsing inhomogeneous alternating field.

If an electrode pattern with coarse grained structure is used, thermal ions can initially be trapped by an electrostatic trapping field (similar to a classical state of the art ICR trap). After the excitation of the cyclotron motion, this electrostatic field can be turned off, and the ions can be trapped by the inhomogeneous alternating field, which they experience during their flight near the trapping electrode pattern. In order to accomplish the initial trapping of the ions by an electrostatic field, a DC voltage can initially be applied to the complete trapping electrode pattern. Hence, thermal ions with small cyclotron radii can be stored in the ICR trap. After the excitation of the ion cyclotron motion, this DC potential can be turned off, and the electrode pattern potentials of the normal operation, as well as the compensation potential can be activated.

As an alternative, a large surfaced, classical trapping electrode can also be mounted in the center of each trapping plate. In the following, these electrodes will be called "central trapping electrodes". A further DC voltage is initially applied to these electrodes. Subsequently, the cyclotron motion of the captured ions is excited. As soon as the cyclotron motion is excited and ions start moving on orbits with larger radii than the radius of this central trapping electrode, the DC voltage is turned off again.

Figure 4:
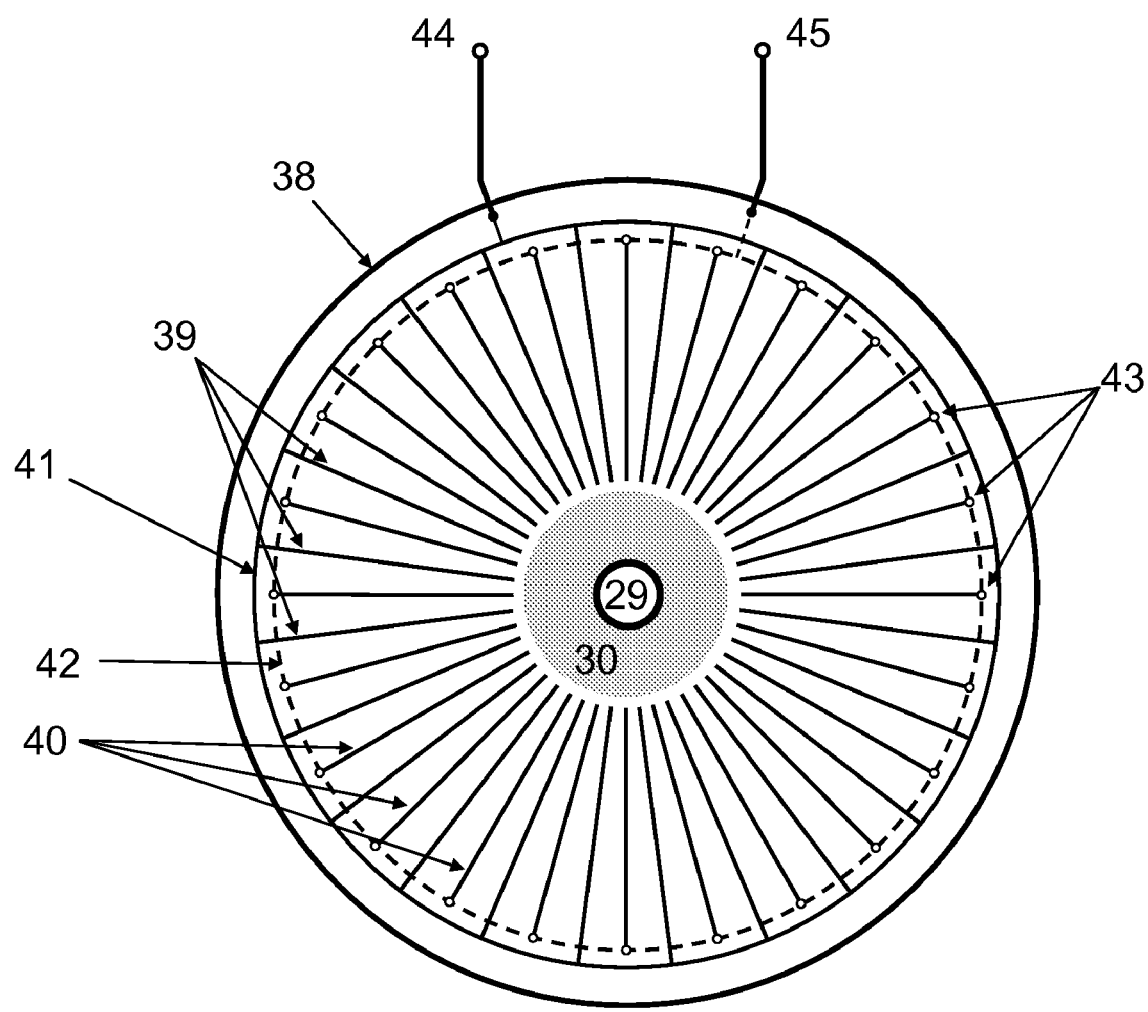
FIG. 4 shows a possible implementation of trapping electrodes to be used in the present invention.

The elements of the electrode pattern can be thin radial spokes. Voltages of the same absolute value but opposite polarity are applied to adjacent spokes. The FIG. 4 shows a plate (38) made of electrically non-conductive material (e.g. ceramic), onto which radial metallic electrodes of two groups (39) and (40) are attached (e.g. by vapor deposition). For simplification, only three electrodes of each electrode group are indicated by numbers in the figure. The electrical connections of all spokes (39) are connected with a first conductor ring (41). Similarly, the electrical connections of the spokes (40) are connected with a second conductor ring (42). The ring (41) is attached (e.g. by vapor deposition) to the front side of the plate (38), the ring (42) to the back side of this plate (38). The connections of the spokes (40) to the ring (42) are made by small metalized holes through plate (38).

In order to trap the ions by a motion-induced pseudopotential a positive DC voltage $V_+$ is applied to the ring (41) at the connection point (44). Similarly, a negative DC voltage $V_-$ of the same absolute value is applied to the ring (42) at the connection point (45). The compensation potential is generated by a simultaneous application of an additional DC voltage $V_{1,Komp}$ at the connection point (44) and an additional DC voltage $V_{2,Komp}$ at the connection point (45). The average value of the voltages $V_{1,Komp}$ and $V_{2,Komp}$ generates the additional ion-attracting electrostatic potential in the ICR trap. If these have the same absolute value but opposite polarities, no additional electrostatic potential is present in the trap. If, for example, positive ions are trapped, and if both of the additional DC voltages have the same negative value of $-0.3V$, the ion-attracting compensation potential of $-0.3V$ is generated in the ICR trap. The additional DC voltages can also be distributed asymmetrically to the spokes. If, for example, $V_{1,Komp}=0V$ and $V_{2,Komp}=-0.45V$, a net potential of $-0.225V$ is generated in the ICR trap, attracting positive ions.

In FIG. 4, the hole (29) is reserved for the introduction of ions or electrons or photons, and the central DC trapping electrode (30) serves for the initial trapping of ions with thermal velocities before their cyclotron excitation.

Ions which are excited in a classical ICR trap by an electric dipole field essentially transversal to the magnetic field can also be accelerated into the direction of the trapping plates due to the axial components (components parallel to the magnetic field) of the excitation field. Due to this acceleration, some of these ions are lost at the trapping plates and this loss reduces the sensitivity of the mass spectrometer. Therefore, more advanced versions of classical ICR traps are equipped with so-called infinity trapping electrodes, as described in the U.S. Pat. No. 5,019,706 (Allemann and Caravatti). In one of the alternatives, the trapping plates are divided into special segments, which roughly depict the equipotential pattern of the dipolar excitation field by means of a voltage divider circuit. These segments normally connected only to the trapping DC voltage, additionally carry radiofrequency excitation voltages during the cyclotron excitation pulse, by means of a capacitive coupling. This scheme corresponds to the excitation of ions which are stored in an infinitely long ICR trap (the so called infinity ICR trap). Thus, no significant axial components of the exciting radio frequency are created, and ion losses are practically eliminated. A further version of infinity-ICR traps uses a three section ICR trap with open ends. The two outer sections act as trapping electrodes and consist of four mantle electrodes, like the middle section of the trap. During the cyclotron excitation pulse the radiofrequency excitation field of the central section, where the ions are trapped, is additionally irradiated by the corresponding two electrodes of each outer section by means of a capacitive coupling.

In order to combine an infinity version ICR trap with the present invention, several alternatives can be considered. The electrodes of the trapping electrode pattern can be divided into segments which depict the equipotential lines of the radiofrequency dipole excitation field in the ICR cell. During the excitation pulse these segments irradiate the corresponding radiofrequency fields into the ICR trap. Another alternative would be to install additional divided electrodes which can irradiate the radiofrequency amplitude gradient between the two excitation electrodes during the radiofrequency excitation of ion cyclotron motion in the ICR trap. During the rest of the time these electrodes will be kept at ground potential, or at a defined electrostatic potential in order to create the compensation field.

FIG. 5a shows the segmented trapping electrodes of a classical infinity ICR trap (state of the art). The electrodes are, for instance, vapor deposited on a ceramic plate (46), which is a little larger in diameter than the cylindrical ICR trap. Only the part of the ceramic plate with conductive material pattern (e.g. metal or titanium nitride) is located in the ICR trap. In this example the trapping electrode is divided into eleven segments (47), the pattern reflecting the equipotential lines of the excitation field. The hole (48) is intended for the introduction of externally generated ions, electrons or a laser beam.

Figure 5B:
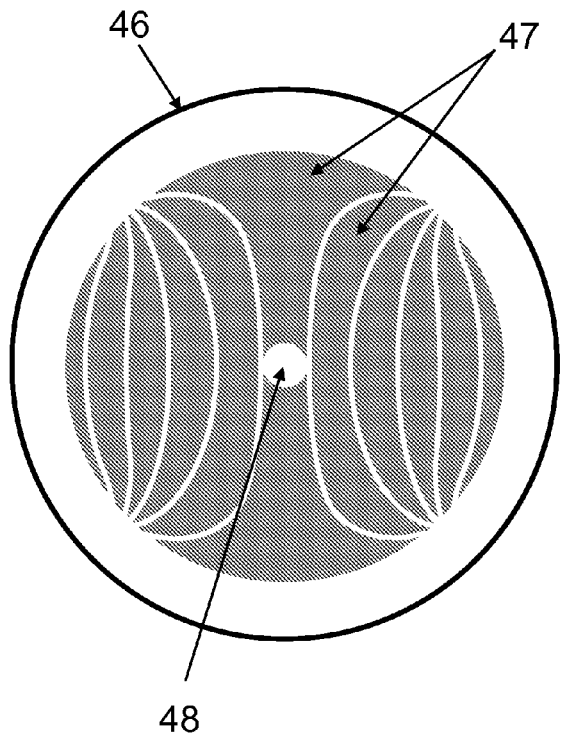
FIG. 5b shows an implementation of infinity electrodes between the spoke-shaped electrode elements of the trapping electrode pattern as a possible carrier of the attractive compensation potential.
Figure 5B:
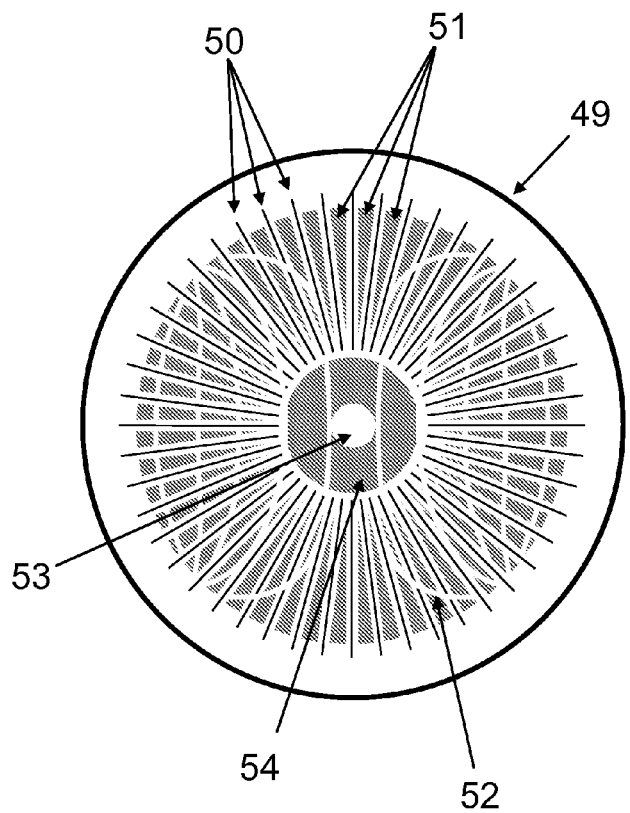

FIG. 5b shows the implementation of an infinity electrode pattern in a trapping plate with spoke-shaped elements of the trapping electrode pattern in order to conduct the method according to the present invention. In this example, the electrodes are also attached onto a ceramic plate (49). Between the spoke-shaped elements (50) of the electrode pattern, additional electrodes (51) are attached (e.g. by vapor deposition). In this example these electrodes (51) in this example are wider than the spoke like trapping electrode elements (50). However, they can also be very thin. These additional electrodes are not only divided in sectors; rather, as illustrated in FIG. 5b, they are further divided in order to roughly reproduce the equipotential lines of the radiofrequency excitation field. Here (53) is the hole for the introduction of ions, or electrons, or a laser beam, and (54) is the central DC trapping electrode (here also divided according to the infinity electrode pattern) for initial trapping of thermal ions with very small cyclotron radii.

A compensation of the space charge-related shift of the cyclotron frequency is possible, if the value of the unperturbed cyclotron frequency of a particular ion mass peak is known. This value can then be used to adjust the compensation potential. A possible application is to add a known substance to the analyte and to perform the compensation by measuring this known peak. Thus, the shifted unknown peaks of the analyte or the analyte mixture will similarly be shifted back. This corresponds to a space charge compensation using an internal standard. The particular ions used for this purpose are sometimes called "lock-in ions".

Although the compensation of space charge-related frequency shifts can be performed by means of a manual correction, the actual routine measurements in mass spectrometry require an automatic correction. Experimentally obtained correlations between the charge distribution in the ICR trap and the shift of the cyclotron frequencies can be used for the automated compensation. In order to achieve this, total or partial ion current measurements must be performed.

Figure 1:
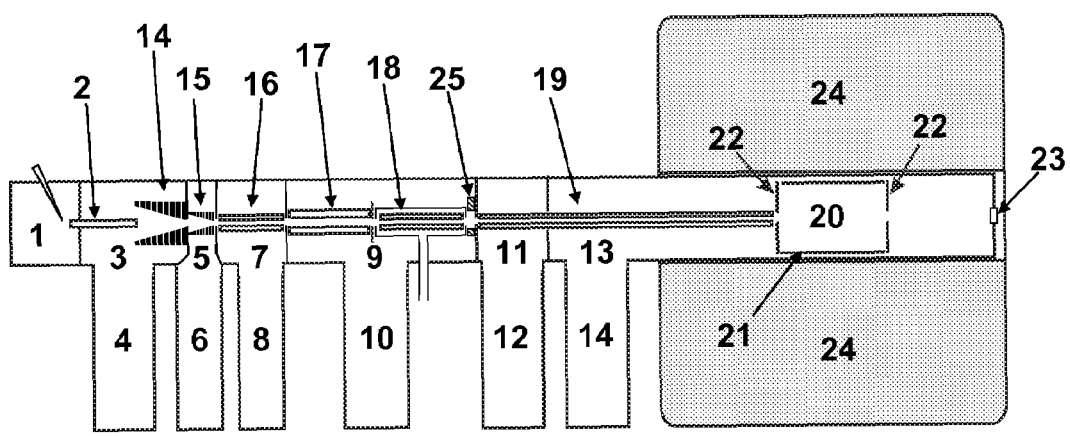
FIG. 1 shows a conventional Fourier transform ion cyclotron resonance mass spectrometer.

In FT-ICR mass spectrometry coupled with chromatography (for example HPLC-FT-ICR MS) this method is of high importance. The increase and decrease of the intensity in a chromatographic peak indicates a strong time-dependent change of the ion charge introduced into the ICR trap. Here, the ion current must be measured very fast, and the compensation has to be performed instantly. A measurement of the instantaneous ion current can, for example, be performed in the ICR trap directly before the acquisition of the actual mass spectrum. Instantaneous ion currents can however also be measured outside the ICR trap using an ion detector (25) (FIG. 1) on the way from the ion source to the ICR trap. The measured values obtained in this way are used for the adjustment of the compensation field. In an algorithm for the automated adjustment of the compensation potential the measured ion current, as well as acquisition parameters (like e.g. the amplitude of the ion excitation) can be considered for the acquisition of an FT-ICR mass spectrum. An "on line" compensation of the space charge effects is very helpful, e.g. for the long-term liquid chromatography-FT-ICR measurements, where only a limited time is available for the acquisition of one single spectrum. During the elution of the analyte molecules as many as possible mass spectra (also MS/MS spectra) per chromatography peak must be acquired and as high as possible mass precision achieved. In chromatography peaks a slope-dependent correction of the ion current by using the last values in the same peak can be very useful to obtain a realistic estimation of the instantaneous ion current.

If the intensity of the chromatography peak varies very strongly, so that it grows very fast and decreases very fast, a completely different number of ions will be introduced into the ICR trap by every pulse. If total ion current is supposed to be measured, the procedure here could be as follows: Electrospray-generated ions can be stored temporarily in a linear trap. Using a pre-calculated short extraction pulse (probing pulse) a correspondingly small fraction of the stored ions is extracted out of the linear trap in order to perform an ion current measurement at the detector (25). The measurement value delivers the total ion current of this known fraction of all temporarily stored ions. Thus, it can easily be calculated on-line how much ion current can be generated with the rest of the ions which are (still) stored in the linear trap. Subsequently, these ions are transferred into the ICR trap, the corresponding compensation potential is activated, and hence, the space charge-related orbiting frequency of the ions is eliminated. The correlation between the number of ions of the short probing pulse and the remaining ions in the linear trap and their space charge effects in the ICR trap can be determined experimentally and calibrated.

In case of an ion current measurement in the ICR trap, the measurement from the previous acquisition can also be used. In case of strongly varying ion current values the special measurement method as previously mentioned with a probing pulse can be applied here too.

Figure 6A:
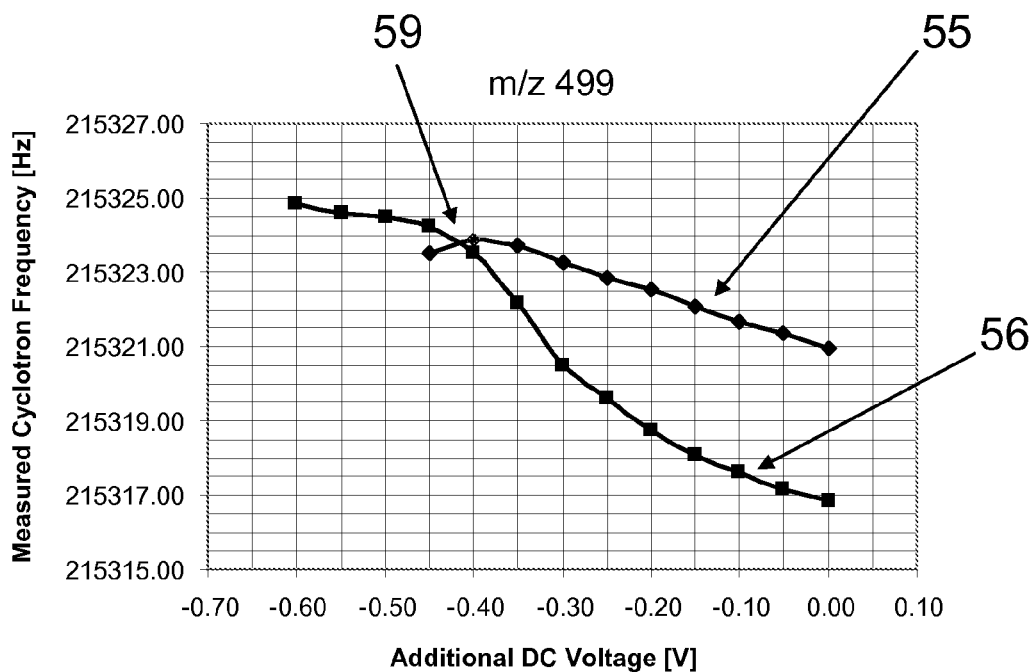
FIG. 6a and 6b show the dependency of the resonance frequencies on the applied additional DC-voltage for two selected mass peaks m/z 499 and m/z 749 from the same spectrum for two different sample concentrations. In each diagram the measurement points of the lower curves are acquired using a tenfold higher concentration than for the upper curves. The curves intersect at a point for a specific value of the applied additional DC voltage where the frequency is no longer dependent on the space charge.
Figure 6B:
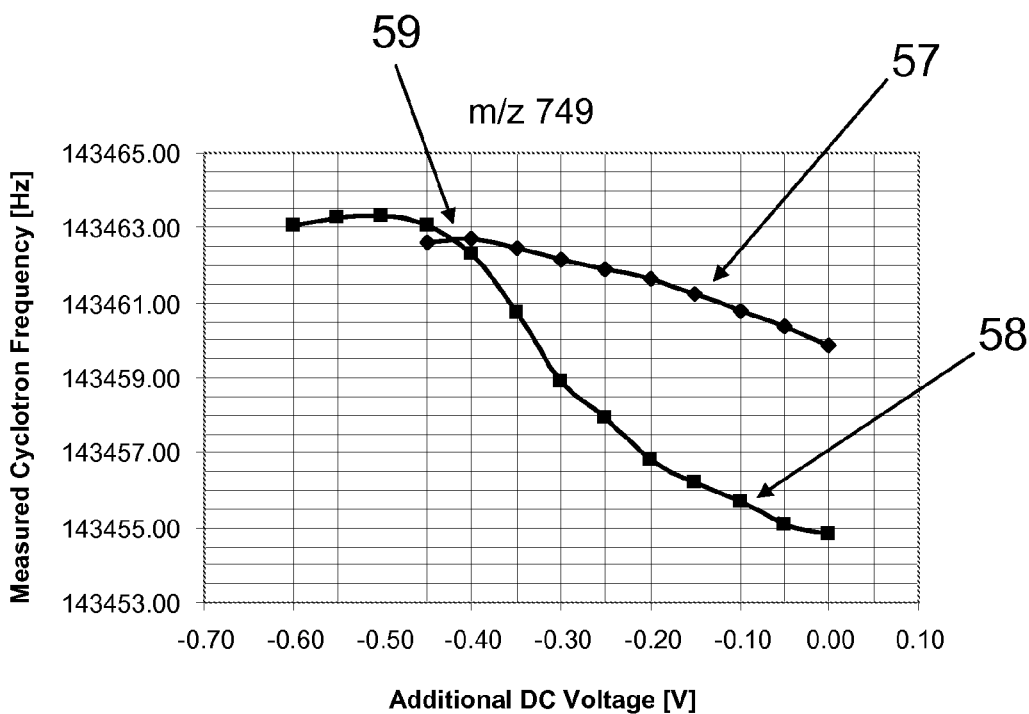

As described above, there exists surprisingly a certain compensation voltage at which the measured cyclotron frequencies of the ions in the ICR trap become independent of the space charge. The curves in the diagram in FIGS. 6a and 6b show the behavior of the resonance frequencies of a positively charged ion species for two different sample concentrations. The spectra were acquired in an ICR trap equipped with a spoke-shaped electrode pattern that creates the motion-induced pseudopotential. In the experiment an additional DC voltage was applied to the negative spokes which generated an additional net DC potential. The measurement points of the curves (55) in FIG. 6a and (57) in FIG. 6b show the progression during the scan of this DC voltage in case of a low sample concentration for the ions of m/z 499 (in FIG. 6a) and of m/z 749 (in FIG. 6b). The measurement points of the curve (56) in FIG. 6a and the curve (58) in FIG. 6b are acquired with an approximately tenfold higher sample concentration of the same sample. Due to the high space charge, they are initially significantly shifted relative to the curves (55) and (57) of the measurements with the low sample concentration. Towards negative values of the DC potential, the two curves approach each other and reach a point (59) where both of the curves have the same value of the measured cyclotron frequency. At this point (59) the measured cyclotron frequency is independent of the number of the ions, and hence, independent of the space charge.

It could be shown that at this value of the compensation voltage, not only ions of one or two masses become independent of the space charge, but ions of all masses and all intensities in the mass spectrum. If a mass calibration is performed for this adjustment value of the potential, the calibration curve is valid for ions of all masses—independent of the number and mixture of ions inside the ICR trap. It is, therefore, a preferred application of the invention to use this special adjustment value of the compensation voltage to operate the ICR mass spectrometer, because in this operation mode, it is no longer necessary to measure or finely control the space charge within the ICR trap. However, rough control of the filling process may still be opportune.

The adjustment of the compensation voltage to show independence on space charge can be performed in a special calibration routine, varying the space charge in the ICR trap, e.g. by different filling times under constant ion current.

To keep this adjustment of the compensation voltage at the optimum value under varying environment conditions, an internal standard ion mass can be used. As long as this "lock-in ion" shows the correct frequency, the ICR trap is well adjusted because otherwise a shift of the frequency must occur. In case of a misadjustment, the frequency of the lock-in ion can be used to readjust the compensation potential.

This mode of operation which makes the cyclotron frequencies independent of the space charge is a method for achieving higher mass precision in routine applications of ICR mass spectrometers.

What is claimed is:

1. A method for operating an ion cyclotron resonance mass spectrometer having a trapping electrode with a trapping electrode pattern thereon, comprising:

(a) applying electrical potentials to the trapping electrode pattern to trap ions in the spectrometer and exciting the trapped ions, the trapped ions thereafter revolving at cyclotron frequencies;

(b) superimposing on the electrical potentials an ion-attracting compensation potential; and (c) adjusting the ion-attracting compensation potential to a value that compensates for a shift of the cyclotron frequencies caused by a space charge of the trapped ions.

2. The method of claim 1 wherein step (a) comprises applying electrical potentials to the trapping electrodes in order to produce one of a motion-induced pseudopotential and an alternating field-induced pseudopotential at the trapping electrode pattern.

3. The method of claim 1 wherein step (b) comprises applying the compensation potential to one of the trapping electrode pattern, additional interspersed electrodes, and the trapping electrode pattern and additional interspersed electrodes.

4. The method of claim 1, wherein step (c) comprises adjusting the ion-attracting compensation potential to a value at which the cyclotron frequencies are independent of a number of trapped ions.

5. The method of claim 4, wherein step (c) comprises performing a series of measurements of the cyclotron frequencies of ions with different masses while varying a number of ions inside the ion trap, and, based on the series of measurements, adjusting the ion-attracting compensation potential so that the measured cyclotron frequencies become independent of a number of trapped ions.

6. The method of claim 4, wherein step (c) comprises performing a calibration of masses at the value of the ion-attracting compensation potential at which the measured cyclotron frequencies are independent of a number of trapped ions.

7. The method of claim 4, further comprising adding lock-in ions to the spectrometer and using a known cyclotron frequency of a lock-in ion at the value of the ion-attracting compensation potential at which the cyclotron frequencies are independent of a number of trapped ions to readjust the ion-attracting compensation potential in order to maintain the compensation potential at a value where the cyclotron frequencies are independent of a number of trapped ions.

8. The method of claim 1, wherein step (c) comprises performing an ion current measurement either in the spectrometer and before the introduction of the ions into the spectrometer and adjusting the ion-attracting compensation potential based on a number of ions introduced into the spectrometer.

9. The method of claim 1, wherein step (a) comprises connecting adjacent electrodes of the trapping electrode pattern to different phases of a radiofrequency voltage, by which an alternating field-induced ion-repulsing pseudopotential is created, and wherein step (b) comprises superimposing the additional ion-attracting compensation field by applying a DC voltage offset to the radiofrequency voltage.

10. The method of claim 1, wherein step (a) comprises connecting adjacent electrodes of the trapping electrode pattern to DC voltages with opposite polarities, by which an ion-repulsing motion-induced pseudopotential is created and wherein step (b) comprises adjusting the values of the opposite polarity DC voltages to be unequal in order to generate the ion-attracting compensation fields.

11. The method of claim 1, wherein step (b) comprises generating the ion-attracting compensation field by applying potentials to electrodes that are separate and insulated from the trapping electrode pattern.

12. The method of claim 1, wherein step (a) comprises initially trapping ions in the spectrometer with a trapping DC voltage field whereupon the trapped ions revolve with initial cyclotron radii, exciting the trapped ions to larger cyclotron radii, applying electrical potentials to the trapping electrode pattern to produce a motion-induced pseudopotential with a repulsive effect upon excitation of the trapped ions to the larger cyclotron radii and subsequently turning off the trapping DC voltage field.

13. The method of claim 1, wherein steps (b) and (c) are performed after step (a) and before detecting an image current.

14. An ion cyclotron resonance mass spectrometer comprising:

a trapping electrode with a trapping electrode pattern thereon;

a first power supply for applying electrical potentials to the trapping electrode pattern to trap ions in the spectrometer by a motion-induced pseudopotential and to exciting the trapped ions, the trapped ions thereafter revolving at cyclotron frequencies;

a second power supply that superimposes on the electrical potentials an ion-attracting compensation potential; and means for adjusting the ion-attracting compensation potential to a value that compensates for a shift of the cyclotron frequencies caused by a space charge of the trapped ions.

15. The ion cyclotron resonance mass spectrometer of claim 14, wherein the trapping electrode pattern comprises radial spoke-shaped electrode elements for the generation of both the motion-induced pseudopotential and the ion-attracting compensation field.

16. The ion cyclotron resonance mass spectrometer according to claim 15, further comprising electrodes interspersed between electrodes of the trapping electrode pattern that are connected to the second power supply in order generate the ion-attracting compensation field.

17. The ion cyclotron resonance mass spectrometer of claim 14, further comprising:

a plurality of excitation electrodes;

means for applying a dipolar excitation radio-frequency voltage to the plurality of excitation electrodes;

additional divided electrodes located between electrodes of the trapping electrode pattern; and means for supplying the additional divided electrodes with graded exciting radio-frequency voltages in order to generate an electric field pattern approximating equipotential field lines produced by applying the dipolar excitation radio-frequency voltage to the plurality of excitation electrodes.

18. The ion cyclotron resonance mass spectrometer of claim 14, further comprising a disk electrode mounted centrally and a power supply for providing a DC trapping potential to the disk electrode in order to trap ions with small cyclotron radii after their introduction into the spectrometer and before their cyclotron excitation.

* * * * *